United States Patent [19]

Jaeger et al.

[11] Patent Number: 5,166,582
[45] Date of Patent: Nov. 24, 1992

[54] DRIVE ARRANGEMENT OF AN OPEN-END SPINNING MACHINE

[75] Inventors: Wolfgang Jaeger, Goppingen; Karl-Heinz Richard, Boll; Hermann Adolf, Ingolstadt, all of Fed. Rep. of Germany

[73] Assignee: Schubert & Salzer Maschinenfabrik AG, Ingolstadt, Fed. Rep. of Germany

[21] Appl. No.: 645,055

[22] Filed: Jan. 24, 1991

[30] Foreign Application Priority Data

Jan. 27, 1990 [DE] Fed. Rep. of Germany ....... 4002422
Dec. 6, 1990 [DE] Fed. Rep. of Germany ....... 4038881

[51] Int. Cl.$^5$ .................................................. H02P 5/46
[52] U.S. Cl. .......................................... 318/45; 318/47; 318/77
[58] Field of Search ................ 318/39, 41, 34, 45, 318/47, 49, 53, 55, 59, 62, 66, 68, 70, 77, 78, 85, 87, 101, 140, 141, 145, 150, 161

[56] References Cited

U.S. PATENT DOCUMENTS

| | | | |
|---|---|---|---|
| 4,263,535 | 4/1981 | Jones | 318/87 |
| 4,334,175 | 6/1982 | Tanaka et al. | 318/66 |
| 4,518,899 | 5/1985 | Wolf | 318/68 |
| 4,525,656 | 6/1985 | Kato | 318/85 |
| 4,617,497 | 10/1986 | Wolf | 318/78 |
| 4,879,475 | 11/1989 | Rüge et al. | 307/68 |
| 4,931,705 | 6/1990 | Wieczorek | 318/49 |

Primary Examiner—Bentsu Ro
Attorney, Agent, or Firm—Dority & Manning

[57] ABSTRACT

Drive arrangement for spinning stations of an OE spinning machine. The feed rollers of the spinning stations can be driven by an electric motor and the draw-off rollers by another electric motor. At least one of these two motors is a synchronous motor. Each of the two motors can be fed supply currents of adjustable frequency by a reverse rectifier, with the rotational speed of one of these two motors being adjusted as a function of the rotational speed of the other motor which is sensed by a pulse generator in such manner that the set rotational speed ratio of these two motors remains constant at operating speeds and in that the operating speeds are ensured even in case of brief network outage.

12 Claims, 3 Drawing Sheets

DRIVE ARRANGEMENT OF AN OPEN-END SPINNING MACHINE

BACKGROUND OF THE INVENTION

The instant invention relates to a drive arrangement of an open-end spinning machine. The open-end spinning machine shall be referred to hereinafter as OE spinning machine for short.

The instant invention relates here to a drive arrangement capable of serving all the spinning stations of the OE spinning machine or one group of spinning stations of this spinning machine with a plurality of spinning stations. Generally such OE spinning machines have a row of spinning stations on either longitudinal side of the machine and it is then possible to either provide for one and the same drive arrangement to drive both rows of spinning stations or to provide either row of spinning stations or each one of some other plurality of groups of spinning stations with its own drive arrangement. The OE spinning machine can be a rotor spinning machine as well as a friction spinning machine. In such OE spinning machines fiber slivers are conveyed by feed rollers to opener rollers which open them into individual fibers and these are conveyed from said opener rollers to fiber collection and twist-producing elements, and in case of a rotor spinning machine to spinning rotors, and in case of a friction spinning machine into a groove formed by two rollers driven in the same direction in which they twisted into a sliver. The fibers collected in the spinning rotor or against the friction rollers are twisted into yarns and each yarn is continuously drawn off by a pair of draw-off rollers and is wound up into a cross-wound bobbin which is driven at its circumference by a winding roller.

The degree of draft in such an OE spinning machine is determined by the relationship between the draw-off speed at which the yarn in question is conveyed by the pair of draw-off rollers and the speed at which the feed roller conveys the fiber sliver to be opened into individual slivers to the opener rollers.

It is desirable to keep the degree of draft constant in normal operation. Until now the procedure for this in conventional OE spinning machine consisted in driving the elements of its spinning stations to be driven, with the exception of the opener rollers, with a common main motor via mechanical gears, among these also toothed-wheel change gears. The construction costs for this are however very high. Also, each change of the degree of draft and of the yarn number to be produced requires a considerable amount of work time and also requires interchangeable gears for toothed-wheel change gears. Each of the opener rollers was driven by a separate motor on either side of the machine, each via a continuously adjustable mechanical gear arrangement.

Depending on the number of electrical networks and on their manner of operation, brief power interruptions, in the order of milliseconds up to a maximum of 2 seconds as based on European standards, are possible. To bridge this outage time an emergency current supply system was designed for spinning machines in the past. Outside of Europe however, and despite constantly improvising automation and precision of spinning machines, outage times exceeding approximately five times the familiar duration of brief network outages must be expected, and it therefore becomes necessary to overcome this extreme duration of brief network outage. In order to compensate in general for the effect of this interference with the technical operation of the spinning machine, the availability of electric energy for operating current as well as for control current must be ensured for longer periods of time (five times longer) than with network outages in the past, lastly normally up to two seconds, i.e. electrical energy must be made available for the spinning machine in particular for the extreme duration of brief network outage. The concept of brief network outage must be broken down in time since qualitatively different problems occur with the extreme duration of brief network outage (up to approximately 10 seconds) than in the time range of milliseconds up to 2 seconds, i.e. because a considerably higher, immediately available energy quantum must be made available for the drive arrangements, for example.

To bridge brief network outages of up to max. 2 seconds, centrifugal masses representing a defined kinetic energy were provided in the past at the shaft of the spinning machine, representing an equivalent of electric energy reserves when a switch-over from motor operation to generator operations is effected in case of electric network outage.

An increase of these centrifugal masses in conventional spinning machines has limits since these masses must be accelerated constantly, and this has unfavorable consequences for the acceleration capability of a supply shaft. Also, these centrifugal masses cannot be varied on the shaft in function of different kinetic energy requirements.

The variety of circuitry for controls and regulation on drives in general, such as for example the formation of the impulse pattern to trigger the output semi-conductor or to signal malfunctions are explained with the utilization of microprocessors, indicating that the utilization of three-phase-current machines requires special regulation, but without any indication of a solution for the special case of brief network outages of extreme duration.

The known solutions (as shown in Publication Meier, Urs.: Mehrmotorenantriebe. in: STZ, No. 11, Jun. 1, 1988, pages 8–10 or DE 25 21 940 C2, DE 26 43 625 A1, DE 27 53 924 A1) give no indications on the basis of which the problem tackled by the instant invention can be solved. The solution given by DE 33 47 113 C2 is based on managing the network outage during piecing with the aim of stopping the machine in a controlled manner. However this problem and solution represent considerable limitations.

Neither does DE 36 41 569 C1 go beyond this. DE 36 41 569 C1 continues to manage an optimal spinning program, with greater regulating possibilities than in DE 33 47 113 C2. Neither solution however can guarantee the bridging of the brief network outage while the spinning program continues to be carried out in technical operation.

It is an objective of the instant invention to simplify the drive arrangement of such an open-end spinning machine or, if it requires several drive arrangements for an equal number of spinning station groups, each with a plurality of spinning stations, for each such group of spinning stations, whereby the brief network outage can be managed more completely in time without technological limitations and whereby the change-over to different yarn numbers to be produced and to different degrees of yarn twist is considerably simplified.

SUMMARY OF THE INVENTION

This objective is attained by the instant invention through the drive arrangement disclosed.

In this drive arrangement according to the instant invention the feed rollers are driven by one motor and the draw-off rollers by another motor, at least one of these motors being a synchronous motor, with the important consistency of any set rotational speed ratio of these two motors at operating speeds being ensured economically and through simple design. This speed ratio can also be changed rapidly and easily.

The drive of the other driven operating elements of these spinning stations can then always be realized without problems, through simple design and economically since no great precision in speed is required of the other spinning elements, or if nevertheless required such as for the winding rollers, these can be driven in a known manner by the same motor which also drives the draw-off rollers, and this also applies to the yarn guide placing the yarns on the cross-wound bobbins since no adjustable gears or only minimal adjusting capability of required gears is necessary for this. The opener rollers can be driven as before by one or several separate electric motors via preferably adjustable mechanical gears. Each spinning rotor or friction roller to be driven by this drive arrangement can then be driven by at least one electric motor of its own. The suction system producing the suction air to convey the opened individual fibers from the opener rollers to the spinning rotors or friction rollers can also be driven by a separate electric motor.

To change the yarn numbers to be produced, the rotational speed ratio of the two motors driving the draw-off rollers and the feed rollers must be changed. Since these motors are powered with a current of variable frequency via static reverse rectifiers, these rotational speed ratios can be adjusted easily by adjusting the output frequency of the reverse rectifiers or of one of the reverse rectifiers. In order to utilize the maximum admissible speeds of the spinning rotors or friction rollers as fully as possible, the following procedure can be followed for the overall adjustment of the drive arrangement. The admissible rotational speed of the spinning rotors or friction rollers is set. The degree of draft which is necessary to produce yarns of the desired number from the fiber slivers is furthermore determined. The rotational speed of the motor driving the draw-off rollers is then determined in such manner that the desired yarn twist results, and the speed of the motor driving the feed rollers is then set so that the desired degree of draft is obtained.

Preferred further developments and embodiments are described in the subclaims.

In spinning mills brief network outages can occur relatively frequently. There may be various causes for this, such as network switch-over, the method of brief interruption used with high-voltage networks, thunderstorms, high winds etc. With the OE spinning machines mentioned at the beginning such brief network outages are of no significance because the draw-off rollers and the feed rollers are driven by one and the same motor.

However, since the draw-off rollers are driven by another motor than the feed rollers in the drive arrangement according to the instant invention, their rotational speeds may change to such an extent in case of a network outage that their speed ratio is also changed to a greater or lesser degree. Although this can be accepted in some cases, it is better and in many instances necessary if the set speed ratios of the two motors of feed rollers and drive rollers do not change or change insignificantly at the most, even during the above-mentioned brief network outages which do not cause a stoppage of the spinning stations.

By contrast to the state of the art, an external system is operating independently of the operations and/or control circuit of the spinning machine in order to make available electrical energy.

This external system is designed in form of a flywheel motor-generator. Technical elements are a flywheel, centrifugal mass which is driven by a motor, said motor being switched to generator operation through switch-over of its reverse rectifier in case of power failure and being able to feed immediately into the operations and control circuit of the spinning machine. The flywheel motor-generator is optionally started up before or after start-up of the spinning machine. The motor of the flywheel motor-generator maintains the rotational speed of a desired flywheel mass, i.e. the stored energy, constant. The stored energy should be sufficient here for the brief network outages of extreme duration (up to 10 seconds). The sizing of the flywheel mass of the flywheel motor-generator depends on the technological goal, as to whether only the control current or also the operations current is to be maintained at the same time in a spinning machine during a brief network outage of extreme duration or whether simultaneous electrical supply of several spinning machines is to be achieved. In variance with the state of the art, this sizing can easily be rendered flexible in the flywheel motor-generator. The external flywheel can furthermore be encapsulated and in this way small volumes can be used at high rotational speeds and with little frictional loss. This configuration requires little construction space.

When the spinning machine starts up, no simultaneous acceleration of the flywheel masses of the flywheel motor-generator is necessary, and therefore no additional load is placed on the accelerating capacity of the spinning machine. At the same time the need for control is reduced by comparison to an integrated emergency power supply in the textile machine. In particular when using ring spinning machines, the independent acceleration of the flywheel motor-generator is advantageous because an independent acceleration of said flywheel motor-generator does not place any load on the drive elements of the ring spinning machine which in fact is already spinning during acceleration.

Further advantageous embodiments and further developments are also derived from the embodiments shown in the drawings and described hereinafter.

DETAILED DESCRIPTION OF PREFERRED EMBODIMENTS

It is assumed in these examples of embodiments that the OE spinning machine is a rotor spinning machine with spinning rotors 11.

The spinning rotors 11 of the spinning stations are driven by a common electric motor 10 via belt and band drive 12. It is also possible to provide for these spinning rotors to be divided into at least two groups, each with a drive motor to drive them, or to drive them with individual electric motors.

The fiber slivers to be opened into individual fibers are fed by feed rollers 13 to opener rollers 14 which open them into individual fibers. The feed rollers 13 are driven by a common synchronous motor 15 via a mechanical gear box 18. The opener rollers 14 are driven via a continuously adjustable gear box 15' and a band gear 16 by a common electric motor 17. It is also possible to provide for the opener rollers 14 to be subdivided into two or more groups, each of which is driven by an electric motor, or to drive them with individual electric motors.

The driven draw-off rollers 19 of the pair of draw-off rollers which draw the yarns from the spinning rotors 11 are arranged on one or several shafts which are driven via an adjustable mechanical gear box 21, preferably a toothed-wheel gear, by an electric asynchronous motor 22. This motor 22 also drives the winding rollers 23 via gear box 21 which services the drive of the cross-wound bobbins 22' into which the yarns are wound. The jigging yarn guide which lays down the yarns into cross-wound bobbins 22' can also be driven by motor 22.

In the drive arrangement according to FIG. 2 a centrifugal mass 24 in form of a flywheel, the purpose of which is explained further below, is also driven by motor 22 via gear box 21.

Furthermore, one or more additional electrical devices may be present, e.g. an electric motor 26 which serves to drive at least one additional component of the OE spinning machine or of the group of spinning stations concerned, e.g. to drive the air conveying device producing the air stream by which the fibers opened by the opener rollers 14 are conveyed into the spinning rotors 11.

The motors 10, 15, 17, 22 and 26 are supplied with current from a three-phase current network 27. The switching device 29 serves to switch the drive arrangement on and off.

Figure 1:
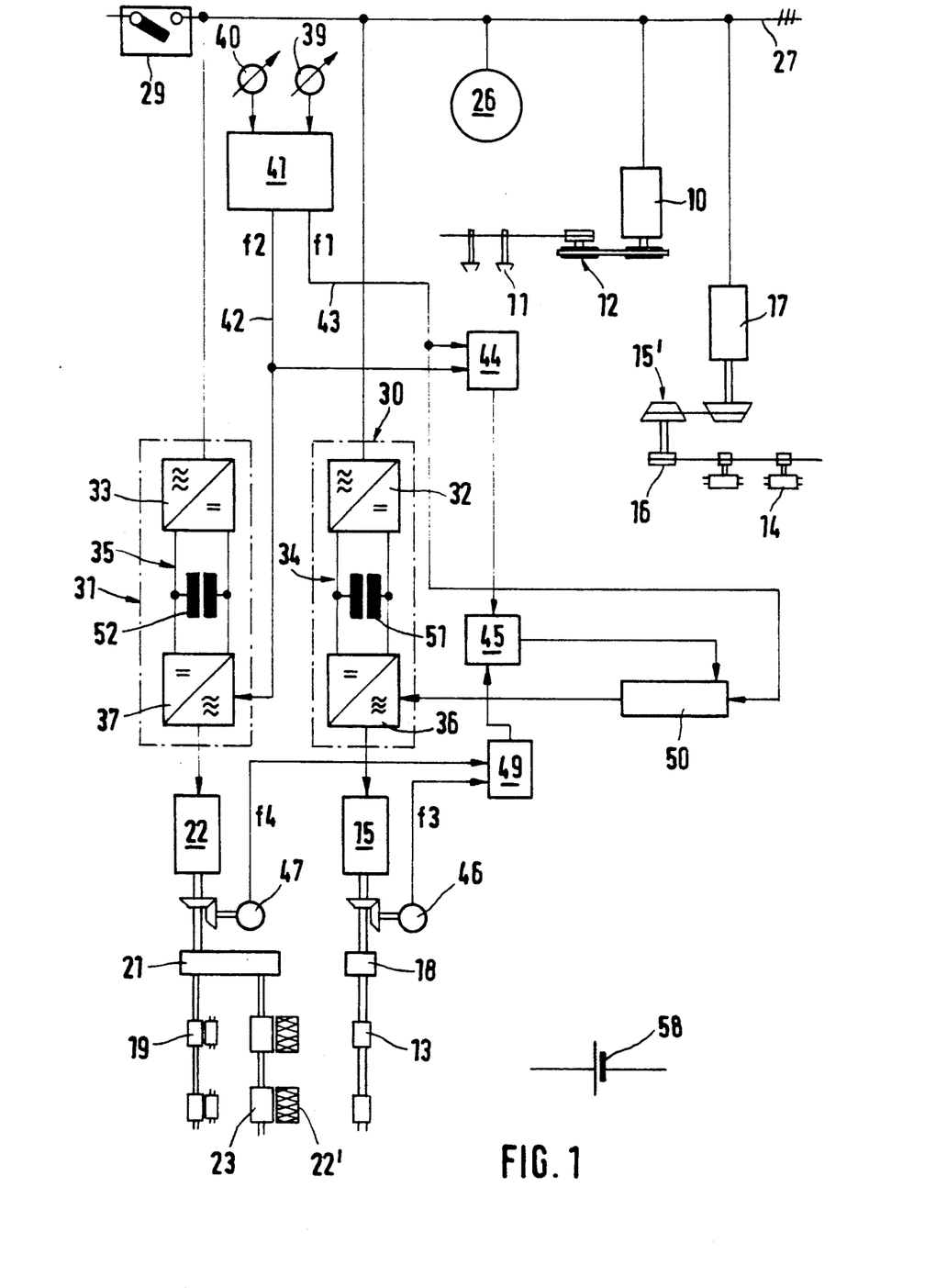
FIG. 1 is a schematic diagram of a drive arrangement for an open-end spinning machine constructed in accordance with the present invention.

In the embodiment according to FIG. 1 the electric motors 15 and 22 are supplied with adjustable-frequency three-phase current, respectively via static frequency rectifiers 30 and 31, each with an intermediate d.c. current circuit.

These frequency rectifiers 30, 31 are each provided with a controlled or non-controlled rectifier 32, 33 and with intermediate rectifier circuits 34, 35 respectively, as well as with static reverse rectifiers 36, 37. In many instances it is also possible to assign a common rectifier to both reverse rectifiers 36, 37. This case is shown in FIGS. 2 and 3, i.e. the rectifier (33) is the common rectifier in that case.

It must be possible to adjust the rotational speeds of the electric motors 15 and 22 independently of each other within wide limits by means of these frequency rectifiers 30, 31 in order to set the yarn numbers to be produced and to similarly adjust the rotational speed of the electric motor 22 also in order to adjust yarn twist. Their rotational speeds are set and adjusted respectively according to the diagrams of FIGS. 1, 2 and 3 by means of two set point adjusters 39 and 40 by means of which the desired initial frequency of the reverse rectifiers 36 and 37 can be set manually or by means of a microprocessor.

The set-point adjuster 39 serves to set the initial frequency of the reverse rectifier 36 and the set-point adjuster 40 to set that of the reverse rectifier 37.

For technological spinning reasons it is necessary that the applicable ratio n2/n1 (draft ratio) for a given yarn number to be spun be maintained constant with as much precision as possible when the spinning machine or its spinning station group runs at operating speeds, where n1 is the rotational speed of the feed rollers 13 and n2 is the rotational speed of the driven draw-off rollers 19. On the other hand it is not required with such OE spinning machines for the yarn twist to be maintained precisely constant at operational speeds, but variations to a certain extent during operation are absolutely admissible here.

The values n1 and n2 are set on the two point-set adjusters 39 and 40 and are entered into a signal-producing device 41 which could be located in a machine command center for instance, and which delivers a preferably pulsating output signal at a frequency f2 over an output circuit 42, said frequency f2 being proportional to the desired value n2 set on the point-set adjuster 40, and said signal-producing device 41 furthermore produces a preferably pulsating output signal at a frequency f1 which is proportional to the desired value n1 set on the point-set adjuster 39.

Each of the two motors 15 and 22 drives a pulse generator 46, 47 interlocking via a mechanical gear box, said pulse generators supplying output signals at the frequencies f3 and f4, where f3 is proportional to the rotational speed of the synchronous motor 15 and f4 is proportional to the rotational speed of the asynchronous motor 22. These two frequencies f3 and f4 are therefore proportional to the actual values of the rotational speeds of these two motors 15 and 22.

First the wiring diagram of FIG. 1 is explained in further detail below.

The signals of frequencies f1 and f2 supplied by the signal-producing device 41 are entered into a computer 44 which calculates from them the ratio f1/f2 corresponding to n1/n2 and thereby calculates the desired value of the ratio of rotational speeds of the two motors 15 and 22.

The preferably pulsating signals at frequencies f3 and f4 supplied by the two pulse generators 46, 47 are entered into a computer 49 which sets up the ratio f3/f4. This ratio corresponds to the actual value of the relationship between the rotational speeds of the two motors 15 and 22. As mentioned earlier, provisions are made here so that at operating speeds, the ratio f3/f4 would be as closely as possible equal to the ratio n1/n2 and thereby to the ratio f1/f2. For that purpose the two computers 44 and 49 enter the ratios f1/f2 and f3/f4 calculated in said computers into a regulator 45 which uses them to calculate the deviation $Dn = f1/f2 - f3/f4$.

The output of this regulator 45 serves to adjust the dividing factor of a sensitive frequency divider 50 which is given the signal at the frequency f1 as input signal. In this frequency divider this input signal at frequency f1 can be transmitted to a frequency multiplier which multiplies it be a certain multiplication factor and the pulsating output signal of this frequency multiplier can then be transmitted to a counter capable of being reset which delivers an output impulse for each different adjustable counter contents and resets itself thereby to zero, so that the next counting may start. The contents of the counter at which it and thereby this frequency divider 50, which can also be designated as an electronic transmission, delivers an output pulses which are adjusted by the regulator 45 in such manner that when a deviation Dn occurs, they are reduced to zero each time. If the deviation is equal to zero, the dividing factor for the frequency divider 50 is not changed since f3/f4 is then exactly equal to f1/f2. During operation at operating speeds the two motors are therefore fed constantly by the reverse rectifier 36, 37 so that their rotational speed ratio is constantly adjusted in accordance with the rotational speed ratio n1/n2 set at the point-set adjusters 39 and 40. Here the asynchronous motor 22 plays the leading role for the synchronous motor 15 because the reverse rectifier 37 feeding it is controlled with respect to its initial frequency, i.e. the frequency of the supply current of motor 22, by the signal appearing on circuit 42 so that the initial frequency of this reverse rectifier 37 is equal to the frequency f2 or is proportional to same. The rotational speed of the synchronous motor 15 is thus always adapted to possible rotational speed variations of the asynchronous motor 22 in such manner that the ratio n1/n2 which is set on the point-set adjusters 39, 40 is maintained as the rotational speed ratio of the motors 15 and 22. If the asynchronous motor 22 changes its rotational speed in case of load variations, this affects the rotational speed ratio of the motors 15 and 22 very briefly at the most, and then only minimally, and as a result of the ratio of the rotational speed of the feed roller 13 and the rotational speed of the driven draw-off rollers 19 remains always constant when this machine or this group of spinning stations runs at production speed.

When the spinning machine is started up from standstill this ratio of rotational speeds need not be constant, and neither when this spinning machine or spindle group in question slows down or coasts to standstill since it is possible to cut off the yarn segments spun during start-up of the spinning machine from standstill and during its coasting until it stops from the remaining spun yarn.

The situation is different when a brief network outage of maximum 1 to 2 seconds occurs during normal operation of the spinning machine or of its group of spinning stations in question, since yarn length that are much too thin or much too thick and can no longer be found may be produced in that case if the rotational speed ratio of the feed rollers 13 and the draw-off rollers 19 changes to a significant extent.

For this reason the drive arrangement of the two motors 15 and 22 is designed so that even with such brief network outage, i.e. voltage outage of the network 27, the motors 15 and 22 cannot change their set speed ratio, or can only change it insignificantly. This is achieved by the large buffer capacitors 51 and 52 intercalated into the intermediate d.c. current circuits 51 and 52. The electric charges stored in them during normal operation of the motors 15 and 22 are so great that they are still able to feed the motors 15 and 22 via reverse rectifiers 36 and 37 sufficiently during a brief outage of the network 27 as mentioned above so that their speed ratios do not change. Here it is absolutely acceptable that their rotational speeds decreases somewhat during this brief network outage, depending on the force of the supply current of the asynchronous motor, but the rotational speed of the synchronous motor 15 follows in such manner that the rotational speed are maintained and so that the rotational speed ratio of these two motors continues to be equal to n1/n2.

During such brief network outages the motors 10, 17 and 26 continue to run due to their own moment of inertial and to the moment of inertia of the elements which they drive. In this case it is unimportant with such brief network outages if the rotational speeds of the spinning rotors 11 as well as that of the opener rollers 14 were to change more than those of the motors 15 and 22 because the opener rollers in any case continue to open the fiber slivers sufficiently even if they rotate at rotational speeds well below their normal operating speed. The rotational speed of motor 10 undergoes an especially insignificant change during brief network outage because the rotors 11 keep the rotational speed changes of the motor 10 within relatively narrow limits during a brief network outage due to their extremely high rotational speeds and resulting great moments of inertia.

During a brief network outage it must be insured that the control and regulating components of the controls and regulations assigned to the motors 15 and 22 do not fail, such as components 39, 40, 41, the reverse rectifiers 36 and 37 and, if the rectifiers 32 and 33 are controlled rectifiers, that neither these nor the computers 44 and 49, the pulse generators 46, 47, the regulator 45 nor the frequency divider 50 and any other electric and electronic components requiring weak current should fail. The emergency power supply of all these components during brief network outages is achieved in this embodiment by means of an emergency-power battery 58 which feeds these components via circuits not shown here. This emergency-power battery 58 may be connected automatically to the supply of the components which it is to power only in case of an outage of network 27, or may be permanently connected to them and be equipped with a booster circuit with charges it continuously or as needed from network 27.

Figure 2:
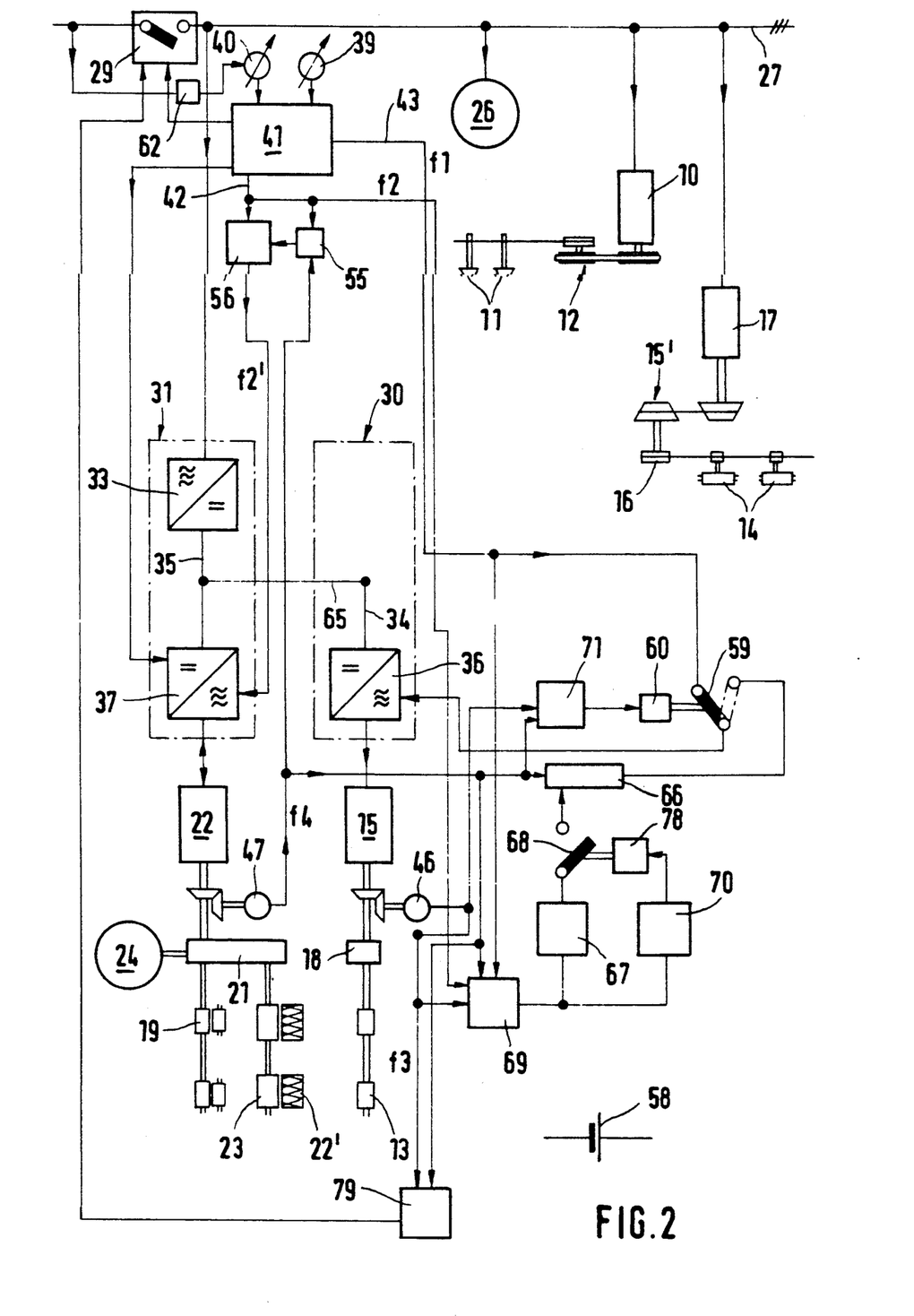
FIG. 2 is a schematic diagram of a modified form of the invention.
Figure 3:
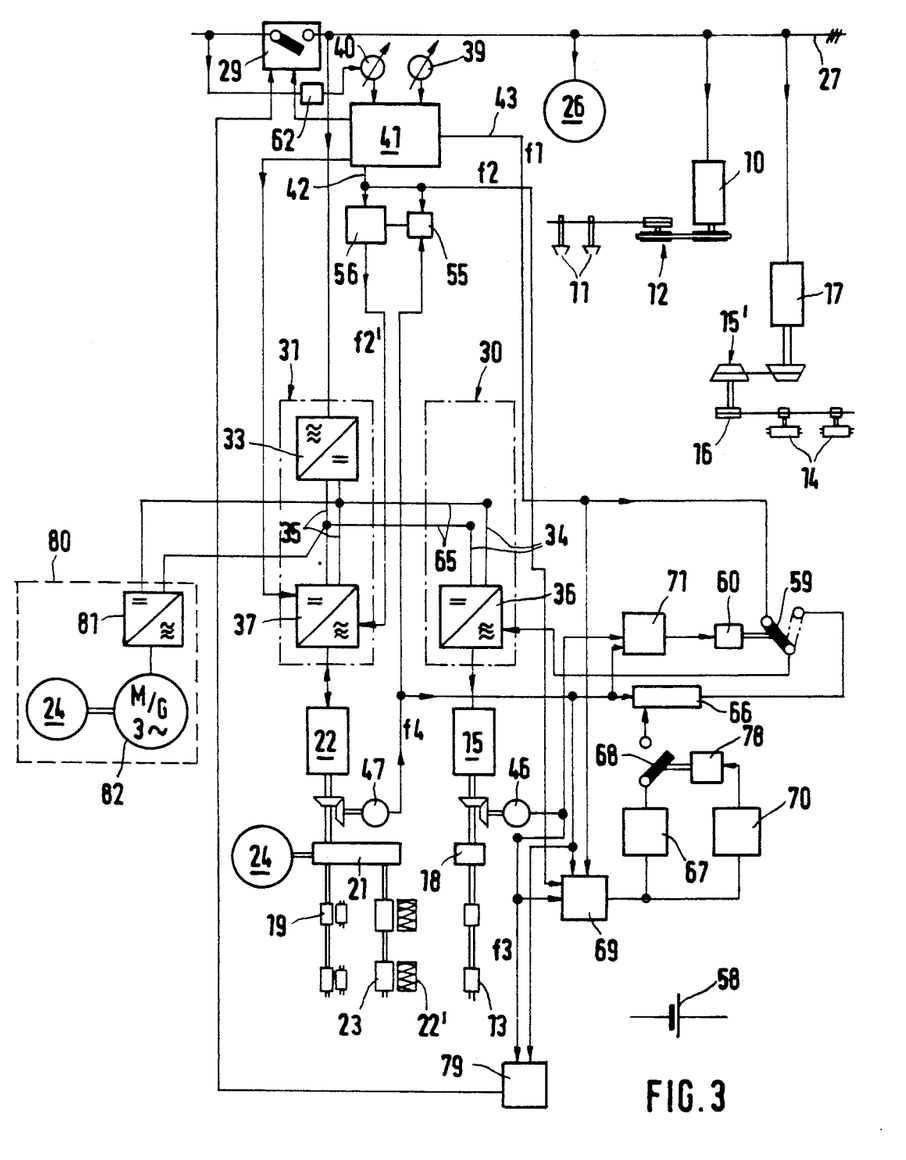
FIG. 3 is a schematic diagram of still another modified form of the invention.

The circuit according to FIG. 2 is now described in further detail below.

Here too, the motor 22 is advantageously made in form of an asynchronous motor since it must in general have a considerably higher capacity than the synchronous motor 15 so that the costs would be too high, at least in many instances, to use a synchronous motor for motor 22. If this is however not the case in some instances, a synchronous motor instead of the asynchronous motor 22 can also be used to drive the draw-off rollers 19 and the winding rollers 23, as well as the flywheel 24.

In this embodiment however, motor 22 must perform like a synchronous motor, and for this purpose the rotational speed of the asynchronous motor 22 is regulated by means of a rotational-speed regulator 55.

The signal of frequency f2 appearing on the circuit 42 is entered into a sensitive frequency divider 56 and also in form of a desired rotational speed value into regulator computer 55. Furthermore the signal of frequency f4, proportional to the rotational speed of motor 22 which is produced by the pulse generator 47 is entered into this regulator computer 55 in form of the actual value of the rotational speed of motor 22. The regulator calculates the deviation f2−f4. If this deviation is greater than zero the rotational speed of the motor 22 is too low and the regulator 55 adjusts the dividing factor of the frequency divider 56 in the sense of a greater output frequency f2'. In this way the rotational speed of motor 22 is increased by means frequency f2' and the output frequency of which is thus determined by said signal. Only when the deviation is equal to f2−f4=0 does the regulator 55 no longer adjust the frequency divider 56, and the motor 22 then runs at a rotational speed n2 which is set on the point-set adjuster 39. If the deviation f2−f4 is negative or positive, the regulator 55 increases or lowers the dividing factor of the frequency divider 56 accordingly until this deviation becomes equal to zero one more. In this manner the rotational speed of the motor 22 is constantly adjusted so that it is equal to n2 or is only minimally able to deviate from it, with any such deviation being immediately compensated by adjustment.

As mentioned earlier, the motor 22 also drives a rotating flywheel mass 24 via gear box 21. When a brief network outage occurs in normal operation, an electronic adjusting device 62 senses this network outage and adjusts the point-set adjuster 40 so that its desired value n2 of the rotational speed of the motor 22 which is transmitted to the signal-producing device 41 drops very rapidly, leading to a corresponding rapid decrease of the frequency f2′ of the control signal of the reverse rectifier 37 in such manner that this motor 22 now runs in the generator mode, whereby its rotational speed is however able to drop only slowly, due to the flywheel 24. The intermediary d.c. circuit 35 of the frequency rectifier 31 is connected via a circuit 65 to the reverse rectifier 36. The electric power which is fed back into the intermediary d.c. circuit 35 during generator-operation of the motor 22 now supplies the energy feeding the synchronous motor 15 via circuit 65 by means of the reverse rectifier 36, with the predetermined rotational speed ratio n1/n2 remaining unchanged, as can be clearly seen from the further description of the circuit according to FIG. 2 below.

The pulse generator 47 feeds its output signal whose frequency f4 is proportional to the rotational speed of motor 22 to a frequency divider 66 whose output is connected via a change-over switch 59 actuated by a servo-component 60 to the control input of the reverse rectifier 36. When this change-over switch 59 is in its switching position represented by a broken line the frequency of the output signal of the frequency divider 66 determines the output frequency of the supply current fed by the reverse rectifier 36 to the motor 15 and thereby its rotational speed. As is explained further below, the frequency divider 66 is automatically set by means of a servo-component 67 so that f1/f2−f3/f4=0 applies. For that purpose a computer 69 is provided into which the signal of frequency f1 appearing on circuit 43, the signal of frequency f1 appearing on circuit 42 and the signals of frequencies f3 and f4 produced by the pulse generators 46 and 47 are entered, and said computer 69 calculates the deviation f1/f2−f3/f4 of the rotational speed ratio of motors 15 and 22.

This computer 69 furthermore always switches on a time function element 70 when the output of said computer 69 is zero while the drive arrangement is switched on, and when the change-over switch 59 is in the switching position indicated by a broken line. This time function element 70 is then able to open a switch 68 by means of its servo-component 78 in order to disconnect the servo-component 67 from the frequency divider 66 so that the division factor of the frequency divider 66 can then no longer be changed.

It should also be explained that all the electronic and electrical components participating in the control and regulation of the power supply for motors 15 and 22 and of their predetermined rotational speed ratio are fed by an emergency battery 58 or instead by any one of the motors with small, driven generator in case of network outage.

Furthermore it should also be mentioned that all the signals of the switching arrangement participating in the control and regulation of the motors 15 and 22, participating signals of frequency f1, f2, f2′, f3, f4 and also other control signals may be signals formed by impulse.

The switching device 29 is switched on to switch on the drive arrangement and thereby to accelerate the spinning stations assigned to it to production speed and to operate them thereafter in continuous operation. At this point in time the change-over switch 59 is in its full extended position as shown, and switch 68 is open. As a result the synchronous motor 15 is supplied from the reverse rectifier 36 with power at a frequency that is proportionate to control the frequency f1. Automation for the run-up can be provided here, said automation increasing the control frequency of the reverse rectifier in a predetermined manner.

The asynchronous motor 22 is supplied with power from the reverse rectifier 37, whose frequency is regulated by regulator 55 so that this asynchronous motor 22 runs up from stand-still until its rotational speed deviation from the desired rotational speed has become equal to zero.

The change-over of switch 59 from run-up position to continuous-production position can be effected by means of a comparator 71 for instance, the inputs of which are connected to the pulse generators 46 and 47. This comparator 71 causes by means of servo component 60 to change over into its switching position represented by a broken line when the relationship f3/f4 has reached a predetermined value or deviates up or down from a predetermined value only by a predetermined amount. This predetermined value can preferably be equal to the relationship f1/f2. It is therefore also possible to use the computer 69, instead of the comparator 71 to change over the change-over switch 59 by ensuring that said change-over switch is brought from its run-up position to its production position as soon as the output of the computer 69 has become equal to zero or deviates up or down only by a predetermined, small amount from zero. It is also possible to provide the change-over of the change-over switch 59 not as described, in function of a state, but in function of time. It is possible, for example, to provide a timer which is switched on as the switching device 29 is switched on, and which triggers the change-over of switch 59 from its run-up position into its production position represented by a broken line after a predetermined period of time which is set on that time.

Simultaneously with the change-over of change-over switch 59 into its continuous-operation position, switch 68 is closed and the output signal of the frequency divider 66 is closed and the output signal which determines the output frequency of the reverse rectifier 36 and thereby also the rotational speed of the synchronous motor 15. The output of the computer 69 is now triggered by the servocomponent 67 of the frequency divider 66 in such manner that the division factor of the frequency divider 66 is adjusted for a sufficiently long period of time in the respective direction so that the deviation from rotational speed ratios f1/f2−f3/f4 calculated by the computer 69 decreases and finally becomes equal to zero. As soon as this deviation has become equal to zero the computer 69 causes the timer 70 which measures a predetermined, set time period to be switched on. If the deviation calculated by the computer 69 remains equal to zero during this period of time, the timer 70 causes the switch 68 to open after measuring this period of time. If on the other hand this deviation f1/f2−f3/f4 again deviates from zero while this time period is being measured, then the timer 70 is set back to zero and remains in that zero position until the deviation again becomes equal to zero.

The switch 68 is thus only open if the deviation calculated by the computer 69 has constantly been equal to zero during the predetermined time period measured by the timer 70.

The rotational speed of the synchronous motor 15 set by the frequency divider 66 now continues to remain constant after opening of the switch 68. Since the deviation calculated by computer 69 is equal to zero and also remains equal to zero due to the regulation of the rotational speed of motor 33, the now existing ratio of the rotational speeds of motors 15 and 22 which no longer changes in the subsequent operation is equal to the desired value n1/n2 set on the point-set adjusters 39, 40.

A monitoring circuit 79 having the following function is switched on simultaneously with the opening of switch 68. The signals of frequency f3 and f4 supplied by the pulse generators 46 and 47 are entered into the two inputs of the monitoring circuit 79. The monitoring circuit 79 sets up the ratio f3/f4. The monitoring circuit 79 verifies the frequency ratio f3/f4 to ascertain whether it is equal to the desired rotational speed ratio f1/f2 and thereby to the ratio n1/n2. If this ratio n1/n2 no longer applies in the now running continuous production the monitoring circuit 79 shuts off the drive arrangement, i.e. the switching device 29 opens.

Even during a brief network outage the rotational speed ratio of the motors 15 and 22 set by means of the frequency divider 66 does not change, as the rotational speed of the synchronous motor 15 is adjusted by means of the frequency divider 66 at the ratio to which it is set so that the yarn quality is not affected by a brief network outage.

FIG. 3 shows the availability of electrical energy going to the production and/or control current circuit by means of an external flywheel motor-generator. The external flywheel motor-generator (80) consists of a motor-generator (82) capable of being changed over with reverse rectifier (81), whereby a separate flywheel (24) is mechanically coupled to the drive shaft of said motor-generator (82). The d.c. connection of the reverse rectifier (81) is coupled to the intermediate d.c. circuit (35).

In normal operation the motor of the flywheel motor-generator maintains the desired rotational speed of a flywheel constant.

In case of a network outage the motor is switched over the generator operation. The energy stored with the flywheel (24) is sized so that electrical energy is supplied via the generator especially at the operational voltage level of the electric drives and/or at the control voltage level during the extreme duration (up to 10 seconds) of a brief network outage.

The drives and control components are operational for a considerably longer time than before thanks to this independent energy supply.

It is also possible to provide a synchronous motor instead of the asynchronous motor 22, if this can be justified economically. The regulator 55 and the frequency divider 56 are then omitted, and the circuit 42 is connected to the control input of the reverse rectifier 37. The remainder of the circuit can remain unchanged.

What is claimed is:

1. A drive apparatus for operating elements of an open-end spinning machine having a plurality of spinning stations provided with feed rollers, opening rollers, and draw-off rollers, comprising:
    a first electric motor for driving said feed rollers of at least a group of said spinning stations;
    a first variable point-set adjuster for establishing a predetermined desired speed for said first electric motor;
    a second electric motor for driving the draw-off rollers of said spinning stations;
    a second variable point-set adjuster for establishing a predetermined desired speed for said second electric motor independent from said desired speed for said first electric motor so that a desired initial draft ratio between said feed rollers and said draw-off rollers can be established;
    at least one of said first and second motors being a synchronous motor,
    a three phase power network;
    a first adjustable frequency rectifier connecting said three phase power network to said first electric motor;
    a second adjustable frequency rectifier connecting said three phase power network to said second electric motor;
    means for setting the output frequency of said first and second adjustable frequency rectifiers independently of each other to drive said first and second motors at predetermined rotational speeds where the rotational speed of said first electric motor is driven at a predetermined ratio of the rotational speed of said second electric motor;
    means for calculating a desired speed ratio between said first electric motor and said second electric motor from said first and second point-set adjusters;
    means for calculating an actual speed ratio between said first electric motor and said second electric motor; and
    means for computing and applying a speed ratio deviation between said desired speed ratio and said actual speed ratio to said means for setting the output frequency of said first and second adjustable frequency rectifiers so that one of said electric motors changes rotational speed to minimize said speed ratio deviation.

2. The drive apparatus as set forth in claim 1, wherein said means for computing and applying said speed ratio deviation between said desired speed ratio and said actual speed ratio comprises a frequency divider, said frequency divider applying said speed ratio deviation to said means for setting the output frequency of said first and second adjustable frequency rectifiers until said deviation becomes equal to zero, and that when the zero deviation value has been present uninterruptedly for a predetermined period of time, the setting of said frequency divider is then no longer changed during subsequent continuous running of said motors.

3. The drive apparatus as set forth in claim 2, further comprising:
    said means for calculating an actual speed ratio comprises a first pulse generating means associated with said first electric motor and a second pulse generating means associated with said second electric motor, said first and second pulse generating means generating frequency signals indicating the actual speed of said motors, and a computer means which calculates the ratio of the actual rotational speed of said two motors from said frequency signals from said first and second pulse generating means and which generates an actual speed ratio signal responsive thereto, a regulator, means for feeding said actual speed ratio signal from said computer means into said regulator, said means for calculating a desired speed ratio comprising means for generating a signal from said first and second point-set adjusters indicating said desired speed ratio and feeding said desired speed ratio signal into said regulator, whereby said regulator computes said speed ratio deviation.

4. The drive apparatus as set forth in claim 1, further comprising means for maintaining a set rotational speed ratio of the two motors during brief network outages.

5. The drive apparatus as set forth in claim 4, wherein an alternate power supply is provided for supplying necessary weak current needed for the functioning of the drive apparatus during brief network outages.

6. The drive apparatus as set forth in claim 5, wherein said alternate power supply comprises a battery.

7. The drive apparatus as set forth in claim 5, wherein said alternate power supply comprises an accumulator.

8. The drive apparatus as in claim 4, characterized in that one of said adjustable frequency rectifiers comprises a reverse rectifier assigned to one of said motors which is switchable to generator operation in case of a network outage and in that the current supplied by said reverse rectifier and its associated motor is fed into the other adjustable frequency rectifier which supplies power for the other motor, so that the other motor is supplied with power during brief network outage, and in that said associated motor capable of being switched over to generator operation also drives a rotatable flywheel.

9. The drive apparatus as in claim 4, characterized in that externally to said power network, and independently of the operation of said spinning machine, an additional motor is provided capable of switching over to generator operation, said additional motor drives its own flywheel without any impediment to the acceleration capability of the spinning machine and in that the kinetic energy of said flywheel is kept at a defined value which is at least equivalent to the needed electrical energy in order to cover the increased electrical power requirements during the extreme duration of a brief network outage, whereby said additional motor switches over to generator operation and feeds the increased electrical power requirements into said power network.

10. The drive apparatus as set forth in claim 1, further comprising intermediate DC circuits are interposed upstream of said first and second rectifiers and are provided with buffer capacitors which supply the power for the two motors during network outages.

11. The drive apparatus as set forth in claim 1, further comprising means for supplying current to said first motor at a frequency that is independent of the rotational speed of said first motor during the run-up of said drive apparatus and for effecting a change-over to the adjustment of said first adjustable frequency rectifier feeding said first motor so that said first adjustable frequency rectifier becomes responsive to said means for computing and applying the deviation between said desired speed ratio and said actual speed ratio.

12. The drive apparatus as set forth in claim 1, further comprising means for independently calculating a difference between a desired speed and the actual speed of said motor not changing speed in response to said deviation and for controlling the speed of said motor so that the difference between its desired speed and actual speed becomes zero.

* * * * *